United States Patent [19]

Sayen et al.

[11] Patent Number: 5,233,881
[45] Date of Patent: Aug. 10, 1993

[54] DOOR LATCH ROD CLIP AND INSULATOR

[75] Inventors: Richard A. Sayen, Grosse Pointe Woods; David M. Cooper, Royal Oak, both of Mich.

[73] Assignee: General Motors Corporation, Detroit, Mich.

[21] Appl. No.: 916,336

[22] Filed: Jul. 17, 1992

[51] Int. Cl.⁵ .......................... F16C 1/10; F16L 3/22
[52] U.S. Cl. .............................. 74/502.4; 74/502.6; 248/68.1; 248/71; 248/222.4
[58] Field of Search ................ 74/502.4, 502.6, 500.5, 74/501.5 R; 248/68.1, 71, 222.4; 24/339, 701

[56] References Cited

U.S. PATENT DOCUMENTS

| | | | |
|---|---|---|---|
| 4,618,114 | 10/1986 | McFarland | 248/68.1 X |
| 4,669,688 | 6/1987 | Itoh et al. | 248/68.1 X |
| 4,685,350 | 8/1987 | Bauer et al. | 74/502.4 |
| 4,691,883 | 9/1987 | Kurihara | 248/74.2 |
| 4,705,244 | 11/1987 | Saotome et al. | 248/68.1 |
| 4,805,479 | 2/1989 | Brightwell | 248/74.2 X |
| 4,889,006 | 12/1989 | Kolinske et al. | 74/502.4 |
| 5,074,676 | 12/1991 | Fannon et al. | 384/10 |
| 5,086,662 | 2/1992 | Tayon et al. | 74/501.5 R |
| 5,113,717 | 5/1992 | Plamper | 248/68.1 X |
| 5,137,120 | 8/1992 | Barbosa | 74/502.6 X |
| 5,172,878 | 12/1992 | Lederman | 74/502.4 X |

FOREIGN PATENT DOCUMENTS

| | | | |
|---|---|---|---|
| 465687 | 1/1969 | Switzerland | 248/68.1 |
| 524708 | 8/1940 | United Kingdom | 248/68.1 |
| 1060590 | 3/1967 | United Kingdom | 248/68.1 |

*Primary Examiner*—Vinh T. Luong
*Attorney, Agent, or Firm*—Raymond I. Bruttomesso, Jr.

[57] ABSTRACT

An assembly secures a pair of rods to a door inner panel and allows linear and lateral movement of the rods relative to the door inner panel. The door inner panel has a keyhole shaped slot including an access portion and a retaining portion. The assembly includes a one-piece flexible rubber rod clip having a rod insulation portion and a tab portion. The rod insulation portion has a pair of oblong bores for receiving the rods for spacing and insulating the rods from the door inner panel. The rod insulation portion has a pair of channels, each channel connecting one of the bores to an outer surface for installing the rods into the bores. The rod insulation portion has a base for engaging the door inner panel. The tab portion has a locking tab spaced from the base of the rod insualtion portion by a trunk. The locking tab has a pair of shoulders for engaging the door inner panel so that the locking tab inserted through the access portion of the slot locates the trunk in the retaining portion of the slot and the base and the shoulders engaging the door inner panel.

3 Claims, 1 Drawing Sheet

DOOR LATCH ROD CLIP AND INSULATOR

BACKGROUND OF THE INVENTION

1. Field of the Invention

This invention relates to a rod clip and more particularly to a rod clip that secures a latch rod to a door inner panel and allows both linear and lateral movement of the rod relative to the door inner panel and maintain the latch rod and the door inner panel in rattle free relationship to each other.

2. Description of the Relevant Art

It is known to have a vehicle door latch connected to remotely located handles and levers by latch rods. The length of the rod between the latch and the handles and levers allows the rod to move and make contact with other rods and the door inner panel and thereby producing a rattle if unconstrained.

It is also known to have a rod clip carried by the door inner panel and the rod clip securing the the rod to the door inner panel and allowing both linear and lateral movement of the rod relative to the door inner panel. U.S. Pat. No. 5,074,676 discloses a rod guide member for guiding linear and lateral movement of the rod relative to the door inner panel and maintains the rod member and support in rattle free relationship to each other by having a pair of integral legs which receive the rod. One leg is thicker than the other to withstand the lateral loads and the other leg has flexible extensions to bias the rod into engagement with ribs on the one leg.

The rod clip, in addition to locating the rod and allowing movement, must only impose a minimum amount of friction on the rod thereby not causing the rod to drag and create higher operating loads.

It would be desirable to have a one-piece rod clip that secures a pair of latch rods to a door inner panel and insulates the rods from each other and the door inner panel while allowing both linear and lateral movement of the rods relative to the door inner panel and minimizes frictional engagement of the rods by the clip.

SUMMARY OF THE INVENTION

This invention provides an assembly for securing a pair of rods to a door inner panel and allowing linear and lateral movement of the rods relative to the door inner panel. The assembly includes the door inner panel having a keyhole shaped slot including an access portion and a retaining portion. A one-piece flexible rubber rod clip has a rod insulation portion and a tab portion. The rod insulation portion has a pair of oblong bores for receiving the rods and spacing and insulating the rods from the door inner panel. The rod insulation portion has a pair of channels, each channel connecting one of the bores to an outer surface for installing the rods into the bores. The rod insulation portion has a base for engaging the door inner panel. The tab portion has a locking tab spaced from the base of the rod insulation portion by a trunk. The locking tab has a pair of shoulders for engaging the door inner panel so that the locking tab inserted through the access portion of the slot locates the trunk in the retaining portion of the slot and the base and the shoulders engage the door inner panel.

One object, feature and advantage resides in the provision of a one-piece flexible rubber rod clip having a rod insulation portion including a pair of oblong bores for receiving a pair of rods and spacing and insulating the rods from the door inner panel and the rod insulation portion having a pair of channels, each channel connecting one of the bores to an outer surface for installing the rods into the bores.

Another object, feature and advantage resides in the provision of the door inner panel having a keyhole shaped slot including an access portion and a retaining portion and the assembly having a one-piece flexible rubber rod clip having a rod insulation portion including a base and the rod clip having a tab portion including a locking tab spaced from the base of the rod insulation portion by a trunk projecting from the base, and the locking tab having a pair of shoulders for engaging the door inner panel so that the locking tab inserted through the access portion of the slot locates the trunk in the retaining portion of the slot and the base and the shoulder engaging the door inner panel.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
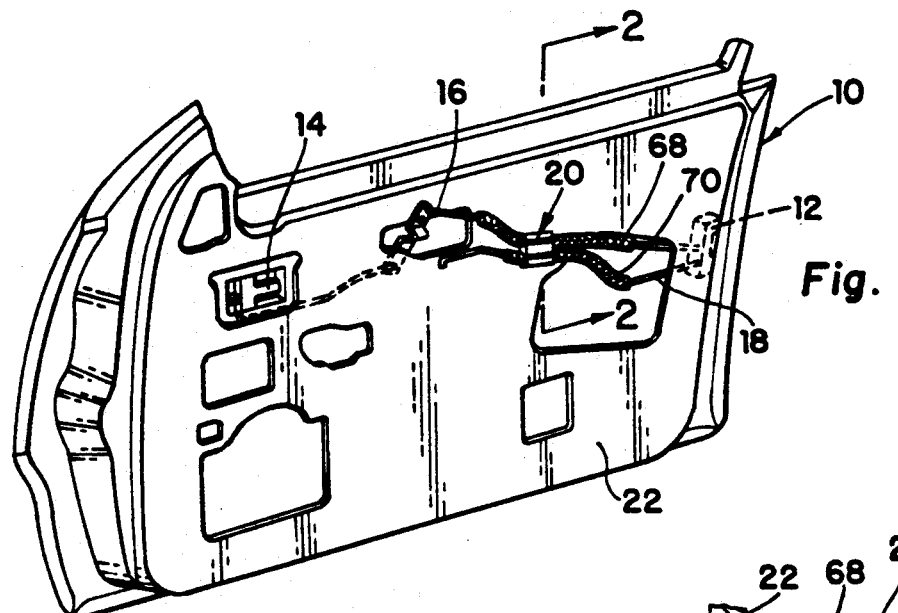
FIG. 1 is a perspective view of an inner door.

Referring to FIG. 1, a door 10 has a door latch 12, shown in hidden line. The door latch 12 is operated remotely by handles and levers, such as an inside unlatching handle 14. A metal door latch rod 16 extends from the door latch 12 towards the inside unlatching handle 14 for operating the unlatching mechanism of the door latch 12. A second metal door latch rod 18 extends from the door latch 12 towards an inside locking lever, not shown, for operating the locking mechanism. A rod clip 20 is located on a door inner panel 22 to secure the rods 16 and 18 between the door latch 12 and the handles and levers.

Figure 2:
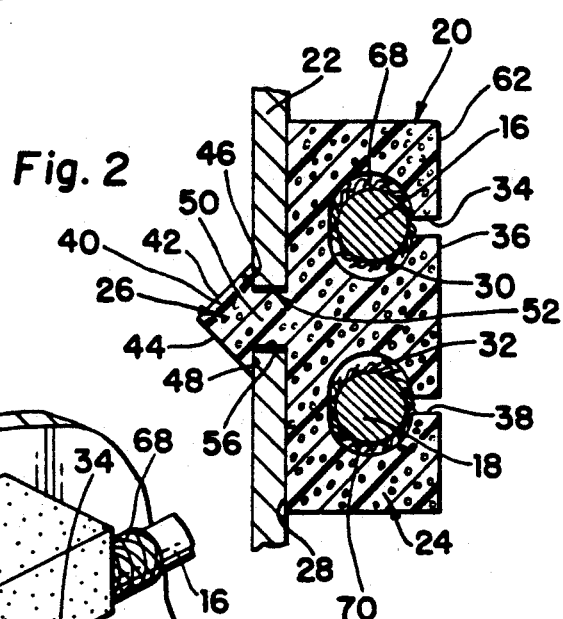
FIG. 2 is a sectional view taken in the direction of arrows 2—2 of FIG. 1 and shows the flexible rod clip and the rods.
Figure 3:
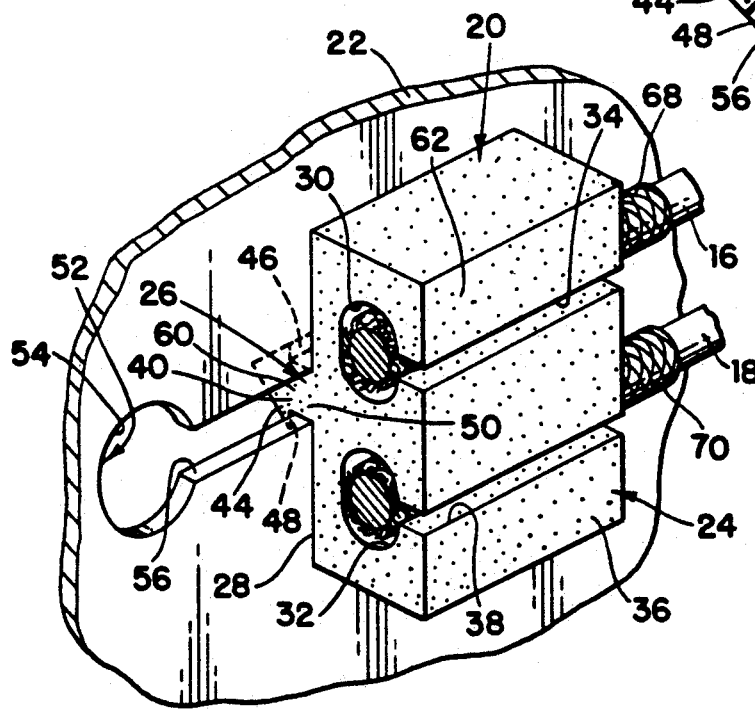
FIG. 3 is a perspective view of the rod clip attached to the door inner panel and retaining the rods.

Referring to FIGS. 2 and 3, the rod clip 20 is composed of a one-piece flexible 50 durometer rubber and has a rod insulation portion 24 and a tab portion 26. The rod insulation portion 24 has a base 28 that engages the door inner panel 22. A pair of oblong bores 30 and 32 extends through the rod insulation portion 24 for receiving the rods 16 and 18. The bores 30 and 32 are larger than the rods 16 and 18 so that nominally the rods 16 and 18 do not engage the rod insulation portion 24. A channel 34 extending from an outer surface 36 to the bore 30 allows the rod 16 to be installed in the bore 30. A second channel 38 extends from the outer surface 36 to bore 32.

The tab portion 26 has a locking tab 40, including a pair of ramped surfaces 42 and 44 and a pair of shoulders 46 and 48, is spaced from the base 28 of the rod insulation portion 24 by a trunk 50. The trunk 50 and the locking tab 40 extend parallel to the oblong bores 30 and 32. The depth of the trunk 50 is slightly less than the thickness of the door inner panel 22 so that both the base 28 and the shoulders 46 and 48 are slightly compressed and engage the door inner panel 22 and the trunk 50, received by a slot 52, is slightly in tension.

Referring to FIG. 3, the slot 52 in the door inner panel 22 is a keyhole shaped slot having an access portion 54, which is greater diameter than the width of the locking tab 40, and a retaining portion 56, which is slightly wider than the trunk 50 but narrower than the width of the locking tab 40. The rod clip 20 is installed on the door inner panel 22 by inserting a first end of the locking tab 40 through the access portion 54 of the keyhole shaped slot 52; the ramped surfaces 42 and 44 of the locking tab 40 ease the insertion through the access portion 54. The rod clip 20 is flexible so that the first end of the locking tab 40 can be pushed into the retaining portion 56 as the locking tab 40 continues to enter the access portion 54. The process continues until a second end 60 of the locking tab 40 is received in the retaining portion 56. The shoulders 46 and 48 and the base 28 engaging the door inner panel 22 prevent movement of the rod clip 20.

Referring to the Figures, as the rod 16 is installed on the door 10, the rod 16 is pushed into engagement with the channel 34 causing the rod insulation portion 24 and, more particularly, an upper corner section 62 of the rod insulation portion 24 to deform and allow the channel 34 to enlarge so the rod 16 can pass through and into the oblong bore 30. The rod 18 likewise engages channel 38 and the rod insulation portion 24 acts similarly for the rod 18 to pass through the channel 38 and into the oblong bore 32.

During operation of the door latch 12, the rods 16 and 18 move predominately linearly through the bores 30 and 32. The rods 16 and 18 could also have lateral movement because of the geometry of the rods 16 and 18 and the movement of the unlatching and locking mechanisms. The oblong bores 30 and 32 are large enough to allow both linear and lateral movement of the rods 16 and 18 without the rods 16 and 18 nominally engaging the rod insulation portion 24. The rod insulation portion 24 spaces and insulates the rods 16 and 18 from each other and the door inner panel 22 so that the rods 16 and 18 are not able to create a rattle noise by engaging each other or the door inner panel 22. Since the rod clip 20 is made of a flexible rubber, any engagement between the rods 16 and 18 and the rod clip 20 will not create any objectionable rattle. In addition, since the rod clip 20 is made of flexible rubber, incidental contact between the rod clip 20 and the rods 16 and 18 has minimal frictional effect thereby not increasing the operation efforts required to operate the door latch.

A pair of cloth sleeves 68 and 70 can encircle the rods 16 and 18, as shown in the Figures, to further ensure slippage of the rods 16 and 18 through the bores 30 and 32 and further reducing the possibility of the rods 16 and 18 grabbing the rod clip 20 as the rods move.

While an embodiment of the present invention has been explained, various modifications within the spirit and scope of the following claims will be readily apparent to those skilled in the art.

The embodiments of the invention in which an exclusive property or privilege is claimed are defined as follows:

1. An assembly for securing a rod to a door inner panel and allowing linear and lateral movement of the rod relative to the door inner panel, the assembly comprising:

the door inner panel having a keyhole shaped slot including an access portion and a retaining portion; and a one-piece flexible rubber rod clip having a rod insulation portion and a tab portion, and the rod insulation portion having an oblong bore for receiving the rod and spacing and insulating the rod from the door inner panel, and the rod insulation portion having a channel connecting the bore to an outer surface for installing the rod into the bore, and the rod insulation portion having a base for engaging the door inner panel, and the tab portion having a locking tab spaced from the base of the rod insulation portion by a trunk and the locking tab having a pair of shoulders for engaging the door inner panel so that the locking tab inserted through the access portion of the slot locates the trunk in the retaining portion of the slot and the base and the shoulders engaging the door inner panel.

2. An assembly for securing a pair of rods to a door inner panel and allowing linear and lateral movement of the rods relative to the door inner panel, the assembly comprising:

the door inner panel having a keyhole shaped slot including an access portion and a retaining portion; and a one-piece flexible rubber rod clip having a rod insulation portion and a tab portion, and the rod insulation portion having a pair of oblong bores for receiving the rods and spacing and insulating the rods from the door inner panel, and the rod insulation portion having a pair of channels, each channel connecting one of the bores to an outer surface for installing the rods into the bores, and the rod insulation portion having a base for engaging the door inner panel, and the tab portion having a locking tab spaced from the base of the rod insulation portion by a trunk and the locking tab having a pair of shoulders for engaging the door inner panel so that the locking tab inserted through the access portion of the slot locates the trunk in the retaining portion of the slot and the base and the shoulders engaging the door inner panel.

3. An assembly for securing a pair of rods to a door inner panel and allowing linear and lateral movement of the rods relative to the door inner panel, the assembly comprising:

the door inner panel having a keyhole shaped slot including an access portion and a retaining portion;

a one-piece flexible rubber rod clip having a rod insulation portion and a tab portion, and the rod insulation portion having a pair of oblong bores larger than the rods for receiving the rods and spacing and insulating the rods from the door inner panel, and the rod insulation portion having a pair of channels, each channel connecting one of the bores to an outer surface for installing the rods into the bores, and the rod insulation portion having a base for engaging the door inner panel and the tab portion extending parallel to the bores and having a locking tab spaced from the base of the rod insulation portion by a trunk, and the locking tab having a pair of shoulders for engaging the door inner panel so that the locking tab inserted through the access portion of the slot locates the trunk in the retaining portion of the slot and the base and the shoulders engaging the door inner panel; and a pair of cloth sleeves, one of the sleeves encircling one of the rods and interposed between one of the rods and one of the bores, and the other sleeve encircling the other rods and interposed between the other rod and the other bore, the sleeves for creating sliding engagement between the rubber rod clip and the rods.

* * * * *